Oct. 2, 1962     T. H. GEWECKE     3,056,403
PARENTERAL SOLUTION EQUIPMENT AND METHOD OF USING SAME
Filed Jan. 26, 1956
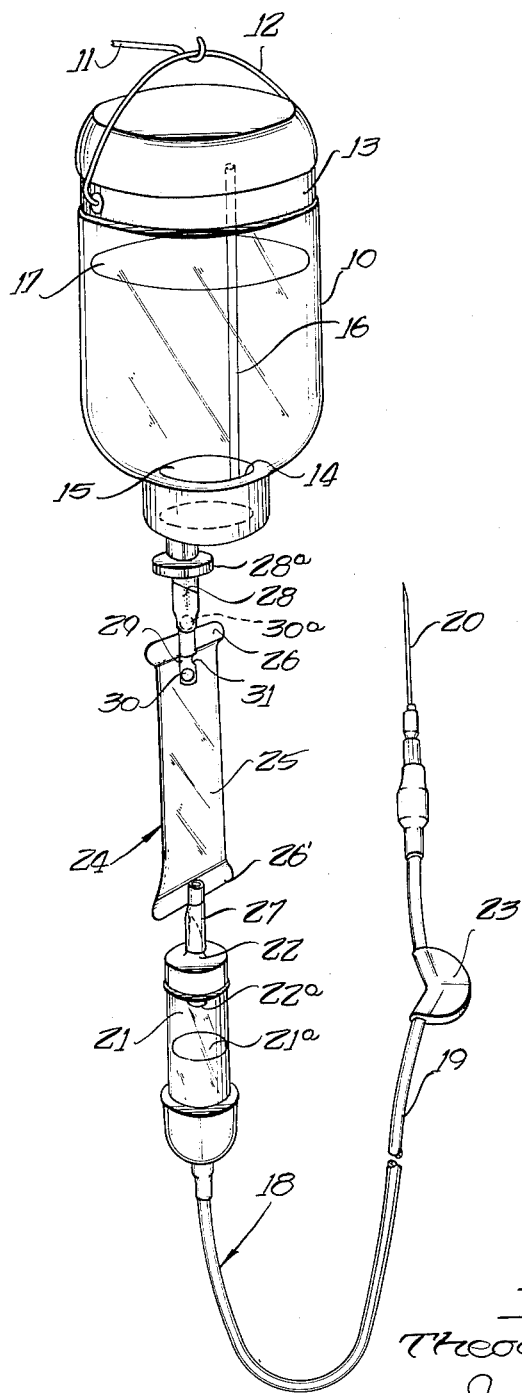
Inventor
Theodore H. Gewecke
Jerome F. Fallon
Attorney

United States Patent Office 3,056,403
Patented Oct. 2, 1962

3,056,403
PARENTERAL SOLUTION EQUIPMENT AND METHOD OF USING SAME
Theodore H. Gewecke, Glenview, Ill., assignor to Baxter Laboratories, Inc.
Filed Jan. 26, 1956, Ser. No. 561,461
3 Claims. (Cl. 128—214)

This invention relates to parenteral solution equipment and method of using same, particularly, to a dispensing device for parenteral liquids adapted to successively dispense equal volumes when interconnected into a parenteral administration system.

In the conventional apparatus for administering parenteral liquids such as glucose, saline, or the like, it is usually necessary to have personal supervision of the apparatus when less than the total quantity of liquid supplied is desired to be administered. The apparatus referred to includes essentially a bottle of a parenteral liquid mounted in a mouth-downward fashion and connected to an arm vein of a patient by means of a flexible tube, equipped at its ends with suitable needles or other puncture devices. Ordinarily, the bottle is mounted 2' to 3' above the site of vein puncture. The rate of administration is regulated by means of adjusting a clamp or other valve device on the tubing. Since the rate of administration is generally slow, a drip meter of the well-known "Murphy" type is often interposed in the tubing to permit visual ascertainment of the rate of flow. Parenteral solutions are generally provided in volumes of 250, 500 and 1000 cc. In some instances, solutions are prepared in volumes of 150 cc.—the general use in such cases being for small children.

From the foregoing, it is evident that should a volume smaller than 250 cc., or in the case of a pediatric solution, 150 cc., be desired to be administered, it is necessary for the nurse or physician in attendance to visually note the drop of liquid level in the solution container (for this purpose, the solution containers are provided with volume markings) and operate the flow control device, i.e., clamp, accordingly.

By the improvement of my invention, this need for personal supervision is eliminated. Another important advantage of my invention is that it permits the subsequent administration of additional metered amounts of parenteral liquid without adding air to a closed system. Therefore, it avoids the tedious and time-consuming operations of purging the set of air and refilling it. At the same time it preserves the integrity of the closed system, considered essential to prevent contamination.

This could be important in the field of anesthesiology where the anesthesiologist desires first to administer 50 cc. of a given hypnotic and subsequently desires to give another similar quantity. In such an instance, the anesthetist could be relieved of the need for watching the administration of the hypnotic solution when his attention is demanded elsewhere—as in the concurrent administration of oxygen, gas, or the like.

For the sake of convenience, I have termed the device of my invention an "isometer," since it permits the administration of equal volumes of liquid. My invention includes a parenteral administration conduit system adapted to deliver sequentially metered quantities of liquid from an elevated larger quantity source to an intended recipient comprising a length of flexible tubing, provided at the ends thereof with upper and lower connector means to establish communication with said source and said recipient, a relatively rigid drip meter having an inlet and outlet connected in said length of flexible tubing, a substantially completely collapsible chamber having a constricted inlet and outlet connected in said length of flexible tubing between said drip meter and said source, an on-off valve operably associated with said inlet, a regulating valve operably associated with said flexible tubing whereby when said on-off valve is open to liquid flow and said regulating valve is closed thereagainst, said chamber will be substantially liquid-filled without substantially disturbing the previously established drip level in said drip meter, and whereby, upon closing said on-off valve and opening said regulating valve the chamber will be substantially emptied without substantially disturbing the said drip level, thereby insuring gas-free administration of liquid.

My invention will be explained in conjunction with the attached drawing, which is an elevational view of the dispensing device of my invention shown in combination with a conventional parenteral liquid administration apparatus.

In the drawing, the numeral 10 designates a parenteral solution bottle mounted in a mouth-downward position from a hook 11 extending from a vertical standard (not shown) by means of a bail 12 secured to bottle 10 by band 13. The mouth 14 of bottle 10 is closed by a resilient stopper 15 through which extend liquid outlet and air inlet passages (not shown). The air inlet passage in stopper 15 provides a receptacle for air tube 16 which extends inwardly of bottle 10. This permits entry of air above the surface of the parenteral solution 17 in bottle 10 to replace the solution as it flows out of bottle 10 into the administration set generally designated 18.

Administration set 18 provides a conduit from bottle 10 to the vein of a patient (not shown). Conventionally, set 18 includes a length of flexible tubing 19, provided at its lower end with a vein puncture needle 20. At the upper end of administration set 18 is provided a glass drop counting device 21 (sometimes termed a "Murphy drip tube" as indicated above) and above the drip meter 21 a puncture member 22. The dripmeter 21 is seen in the drawing to comprise a tubular chamber equipped with the usual inlet and outlet. The inlet comprises a drop-forming tube 22a constricted relative to the expanded cross-sectional area of the collapsible chamber and cross-sectional area of the dripmeter in general. The drop-former 22a is so sized, of course, as to develop drops when the liquid is permitted to flow into said dripmeter from said source, thereby allowing a visual determination of the rate of flow. Such dripmeters are well known to the parenteral solution art and can be found in such early U.S. patents as No. 1,497,999 (1921) and No. 2,186,987 (1938). Conventionally, puncture member 22 is inserted into the liquid outlet passage of stopper 15. The rate of flow of solution 17 through set 18 is governed by regulating clamp 23 mounted on tubing 19.

In the improvement of my invention, a dispensing device or isometer is interposed between administration set 18 and bottle 10, maintaining thereby the continuous closed conduit for the administration of solution 17.

The dispensing device of my invention is generally designated 24 and includes a chamber 25 formed from an envelope or tube of translucent or transparent flexible thermoplastic material such as polyvinyl chloride. The ends of chamber 25 are closed by heat-sealing as at 26 and 26'. At 26', the lower heat-sealed end, an outlet tube is secured which extends outwardly of chamber 25 a sufficient distance to receive the puncturing spout of puncture member 22. In the embodiment shown, the outlet tube 27 is secured to chamber 25 in substantially coaxial relation thereto by the heat-sealing operation which resulted in closure 26'.

In a similar fashion, inlet tube 28 is heat-sealed in the upper end portion of chamber 25. The heat seals at 26 and 26' are substantially coplanar, which urges chamber 25 to a fully collapsed or lay flat condition when no liquid is present therein. Inlet tube 28 ensleeves a portion of second puncture member 28a which, in turn, is inserted into the liquid outlet passage of stopper 15.

Inlet tube 28 differs from outlet tube 27 in the embodiment shown in extending inwardly of chamber 25 a distance sufficient to accommodate a valve element generally designated 29. Valve element 29 includes a ball 30 press-fitted into the flexible plastic tubing of which inlet 28 is constructed. Access openings 31 are provided in the wall of inlet 28 at a point inward of heat-seal 26.

*Operation*

When a parenteral administration apparatus is assembled in the form shown in the accompanying drawing, and a ball 30 is in the position shown in heavy line, the apparatus can operate in a conventional fashion, isometer 24 merely acting as an additional length of conduit. During such operation, the entire chamber portion 25 of isometer 24 is filled with liquid, the only air in the system being between the drop former 22a and the liquid level 21a of the drip meter 21.

When, however, it becomes necessary to introduce a metered amount of parenteral liquid into the patient, and the metered amount is less than that contained in bottle 10, then isometer 24 can be operated to achieve this result merely by first fully closing clamp 23 and moving ball 30 into the dotted position designated 30a. This latter movement can be performed by simple finger manipulation, and when completed, prevents further flow of solution 17 into parenteral administration set 18 and isometer 24. Upon opening clamp 23, the liquid contained in chamber 25 is caused to flow out through set 18, whereupon the flexible walls of chamber 25 collapse. Since valve element 29 is also effective in preventing passage of air through inlet 28, a metered amount of air-free solution is administered to the patient.

This air-free administration is considered significant in that the prior art devices, although capable to administering a metered amount of fluid, generally achieve the same through replacement of the administered liquid with air— such as occurs within bottle 10. This type of administration is susceptible to the danger of causing an embolism in the patient if the outlet clamp is not closed immediately upon the outflow of the last liquid from the prior art metering chamber. The device of my invention automatically avoids this danger since the flexible walls of chamber 25 collapse into a lay-flat condition.

The repetition of administration mentioned above in connection with anesthesiology is achieved by merely closing clamp 23 so that the flow of parenteral solution 17 through set 18 is stopped, moving ball 30 to the position depicted in heavy line, allowing chamber 25 to be refilled with liquid, moving ball 30 to the position designated 30a, and then opening clamp 23 an amount corresponding to the rate of flow desired from a visual observation of the rate of the drop in drip meter 21. By employing a rigid drip meter 21, as of glass indicated above, there is no danger that the drip meter will collapse and destroy liquid level 21a.

Although I have shown the preferred embodiment of my device equipped with a ball valve, it is to be clearly understood that my invention includes also those variations wherein the on-off closure arrangement for inlet 28 is achieved by clamps or other devices known to the art.

The foregoing detailed description was set forth for purposes of illustration only and no unnecessary limitation is to be inferred therefrom.

I claim:

1. In a parenteral liquid administration system, the combination of a storage container of parenteral fluid and an administration set providing a fluid passageway from said container to a recipient, said administration set comprising:
    (A) an adapter connected to said storage container,
    (B) a length of flexible tubing extending between said adapter and recipient whereby said set is simultaneously coupled to said container and recipient,
    (C) a dripmeter having an outlet connected in said length of tubing and an inlet communicating with said adapter, said inlet comprising a drop-forming tube constricted relative to the cross-sectional area of said dripmeter and sized to develop drops when fluid in controlled amount is permitted to flow into said dripmeter, and
    (D) a substantially completely collapsible chamber having a constricted inlet and outlet connected in said length of tubing between said dripmeter and said adapter,
        (i) said chamber having end edges adjacent its inlet and outlet, with said edges being substantially coplanar to provide substantially complete collapse of said chamber to a flat condition,
        (ii) an on-off valve mounted on said set adjacent said chamber inlet to control the flow of fluid into said chamber, and
        (iii) a regulating valve mounted on said set below said chamber to control the rate of fluid flow through said administration set.

2. In a method of administering a metered quantity of parenteral liquid from a container source containing a larger quantity than that desired to be administered, the steps of:
    (A) interconnecting in the conduit between said source and the intended recipient of said liquid, a chamber capable of substantially completely collapsing to a lay-flat condition and having a known internal volume when substantially completely expanded,
    (B) closing the outlet of said chamber against fluid flow therethrough,
    (C) filling said chamber with liquid from said source,
    (D) closing the inlet of said chamber against fluid flow therethrough, and
    (E) opening the outlet of said chamber, whereby a quantity of fluid is dispensed corresponding to the known internal volume of said chamber when substantially completely expanded, all while said container source, conduit, chamber and recipient are interconnected.

3. In parenteral fluid administration apparatus wherein an administration set provides a fluid passageway from a storage container of parenteral fluid to a recipient, the improved administration set comprising:
    (A) an adapted for connection to the storage container,
    (B) needle means for connection to said recipient,
    (C) a length of flexible tubing extending between said adapter and said needle means, whereby said set simultaneously is connected to said recipient and container,
    (D) a dripmeter having an outlet connected in said length of tubing and an inlet communicating with said adapter, said inlet comprising a drop-forming tube constricted relative to the cross-sectional area of said dripmeter and sized to develop drops when fluid in controlled amount is permitted to flow into said dripmeter,
    (E) a substantially completely collapsible chamber of predetermined volume,
        (i) said chamber having a constricted inlet and outlet connected in said length of tubing between said dripmeter and adapter,
        (ii) said chamber having end edges adjacent its inlet and outlet, with said edges being substantially coplanar to provide substantially complete collapse of said chamber to a flat condition,
    (F) an on-off valve mounted on said set adjacent said chamber inlet to control flow of fluid into said chamber, and
    (G) a regulating valve mounted on said set below said chamber to control the rate of fluid flow through the administration set.

References Cited in the file of this patent

UNITED STATES PATENTS

| | | | |
|---|---|---|---|
| 1,375,430 | Walker | Apr. 19, | 1921 |
| 2,335,799 | Schwab | Nov. 30, | 1943 |
| 2,556,655 | Lane | June 12, | 1951 |
| 2,663,298 | Rose | Dec. 22, | 1953 |
| 2,702,034 | Walter | Feb. 15, | 1955 |
| 2,725,055 | Gewecke | Nov. 29, | 1955 |
| 2,758,598 | Cutter | Aug. 14, | 1956 |
| 2,784,716 | Broman | Mar. 12, | 1957 |
| 2,853,069 | Beacham et al. | Sept. 23, | 1958 |
| 2,879,767 | Kulick | Mar. 31, | 1959 |

FOREIGN PATENTS

| | | | |
|---|---|---|---|
| 1,108,782 | France | Sept. 14, | 1955 |

OTHER REFERENCES

Walter et al.: Surgery, Gynecology and Obstetrics, Vol. 94, No. 6, pp. 687–692. (Available in Scientific Library.)

Fenwal: Advertisement Surgery, Gynecology and Obstetrics, Volume 95, No. 4, October 1952 Advertising section, page 12. (Available in Scientific Library.)